May 9, 1967

R. M. VAN HOUSE ETAL 3,318,421

BRAKE ADJUSTING SYSTEM

Filed Oct. 26, 1964

INVENTORS
Robert M. VanHouse
Edward J. DeHoff
Anton F. Erickson
BY
D. D. McGraw
THEIR ATTORNEY INVENTORS
Robert M. VanHouse
Edward J. DeHoff
Anton F. Erickson
BY
D. D. McGraw
THEIR ATTORNEY INVENTORS
Robert M. VanHouse
Edward J. DeHoff
Anton F. Erickson
BY
D. O. McGrew
THEIR ATTORNEY

United States Patent Office 3,318,421
Patented May 9, 1967

3,318,421
BRAKE ADJUSTING SYSTEM
Robert M. Van House, Edward J. De Hoff, and Anton F. Erickson, all of Dayton, Ohio, assignors to General Motors Corporation, Detroit, Mich., a corporation of Delaware
Filed Oct. 26, 1964, Ser. No. 406,292
6 Claims. (Cl. 188—106)

The invention relates to a brake mechanism and adjusting means for the mechanism which keeps a brake shoe adjusted closely to the braking member so that a minimum additional movement of the brake shoe is required to engage the brake while at the same time providing sufficient brake shoe clearance to prevent drag of the brake shoe on the braking member when the brake is released.

One aspect of the invention includes a hydraulic piston and cylinder assembly having an adjuster which permits brake actuating movement of the piston and returns the piston to an adjusted position upon release. When the piston movement required to engage the brake shoe exceeds a predetermined amount the adjuster limits the return movement of the piston so that the brake shoe clearance is maintained. Once this adjustment has taken place, the adjuster senses any change in brake shoe clearance upon each brake actuation as compared to the last brake actuation by the piston and adjusts the return limit of the piston. Thus the piston is adjusted on each brake actuation an infinitesimal amount depending on brake shoe wear. The adjuster includes a groove formed in the piston and containing a multi-convolution spring which in its free condition is somewhat larger in outer diameter than the diameter of the cylinder in which the piston moves. The solid length of the spring is less than the width of the groove. When the piston is actuated, the adjuster spring is compressed. If the spring reaches its solid length and more piston movement is still required, the spring is moved in the cylinder with the piston against the frictional forces set up between the spring and the cylinder and remains in this position. Retracting springs which move the brake shoe out of engagement also move the piston rearwardly upon brake release until the forward edge of the groove engages the spring in its new position. Thus the spring prevents further retraction of the piston and brake shoe. If, however, for any reason the brake shoe should be forced farther backward than the retracted position so established, the adjuster spring will permit such adjustment rearwardly. This may occur when new brake linings are installed, for example. The adjuster spring friction forces must, therefore, be sufficient to resist the retracting spring movement of the brake shoe but must not be sufficient to prevent the piston from moving forwardly under pressure when the brake is being engaged.

The brake also is provided with a manual brake apply mechanism for use as a parking brake as well as an emergency brake. This mechanism includes a mechanical linkage having a push rod with one end engaging the brake shoe and the other rod end engaging the adjusting screw provided in a pivoted lever. A suitable ratchet mechanism is connected to the lever and adjusting screw. Mechanical actuation by pivotal movement of the lever will engage the brake shoe with the member to be braked. When sufficient pivotal movement of the lever is required for this purpose, the ratchet mechanism will cause the adjusting screw to advance and hold the push rod in a position relative to the brake shoe upon brake release so that the clearance set up by the ratchet adjusting mechanism is within the limits of clearance set up by the piston adjusting mechanism. The adjustment of the ratchet mechanism occurs in increments established by the mechanical leverage, the diameter of the ratchet wheel, and the number of teeth on the ratchet wheel. These controlling factors are so correlated that adjustment of the mechanical actuating mechanism is in accordance with adjustment of the piston actuating mechanism.

Figure 1:
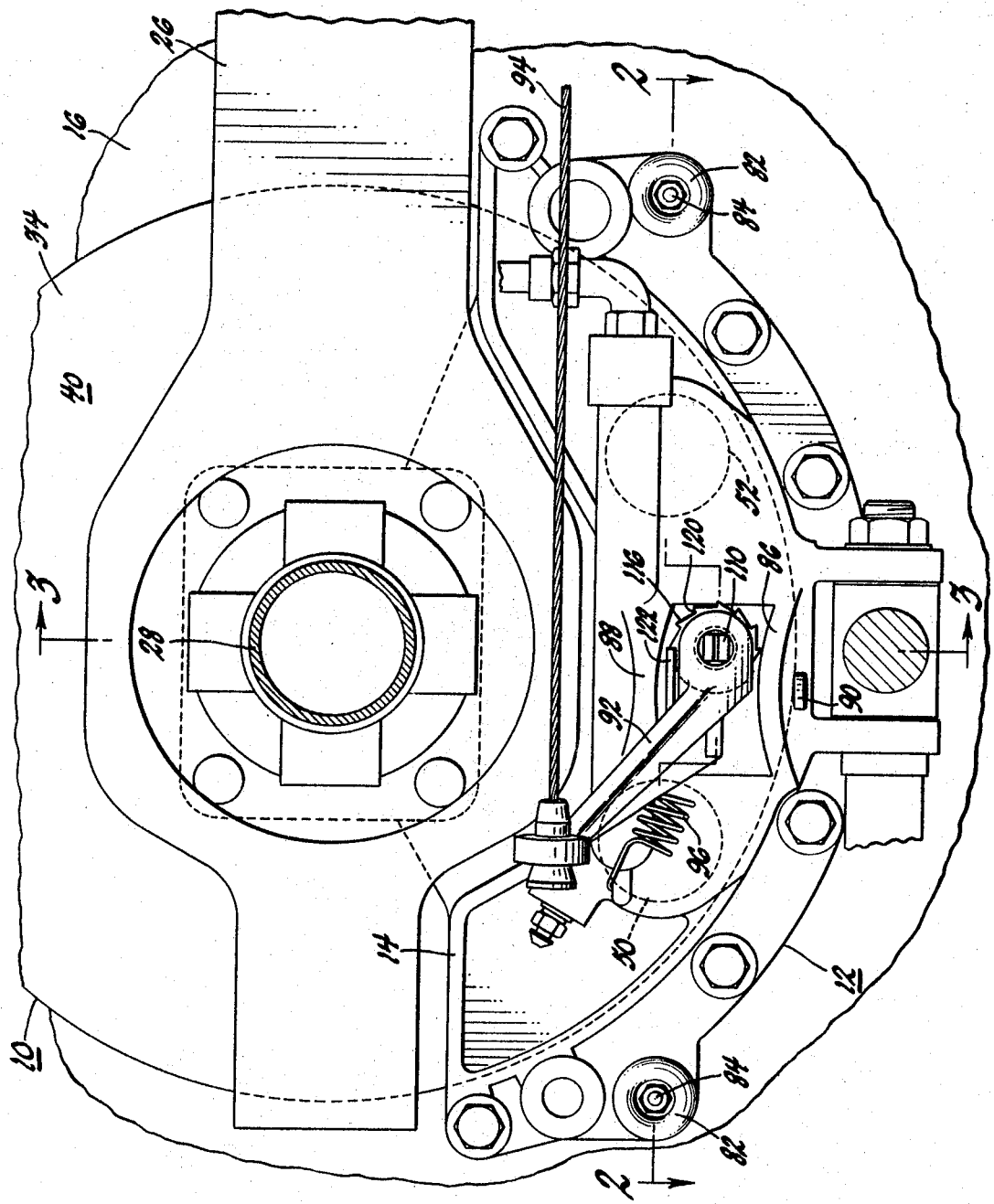
FIGURE 1 is an elevation view with parts broken away and in section illustrating a brake mechanism embodying the invention.

The brake mechanism 10 is illustrated as a disc brake assembly having a caliper assembly 12 secured to or formed as a part of a brake and bearing housing 14. A wheel 16 is secured to a hub 18 having a stub axle 20 extending into the bearing portion of housing 14 and rotatably positioned therein on wheel bearings 22 and 24. Housing 14 is secured to the vehicle suspension link 26. Since the entire assembly is illustrated as a rear wheel and brake assembly, a driving axle 28 is illustrated as being spline connected through splines 30 to stub axle 20. Wheel 16 and hub 18 have a mounting member 32 secured thereto on which a braking member 34 is slidably splined by splines 36. Braking member 34 is a disc in the particular mechanism illustrated, and is annular in form so that the splines 36 are on the inner annulus. The disc has opposite friction surfaces 38 and 40 and is rotatably received within the caliper assembly 12. The caliper assembly 12 has a movable or floating brake shoe 42 received therein in such a manner that the shoe moves axially toward and away from the disc 34 and is prevented from rotation relative to the caliper assembly 12. Shoe 42 is provided with a pad 44 of suitable friction material which is positioned to engage disc surface 40. The caliper assembly has a stationary shoe 46 formed as a part of the assembly and adjacent the disc surface 38. A pad 48 of friction material is secured to stationary shoe 46 so that it may be engaged by disc surface 38 when the brake is actuated.

Figure 2:
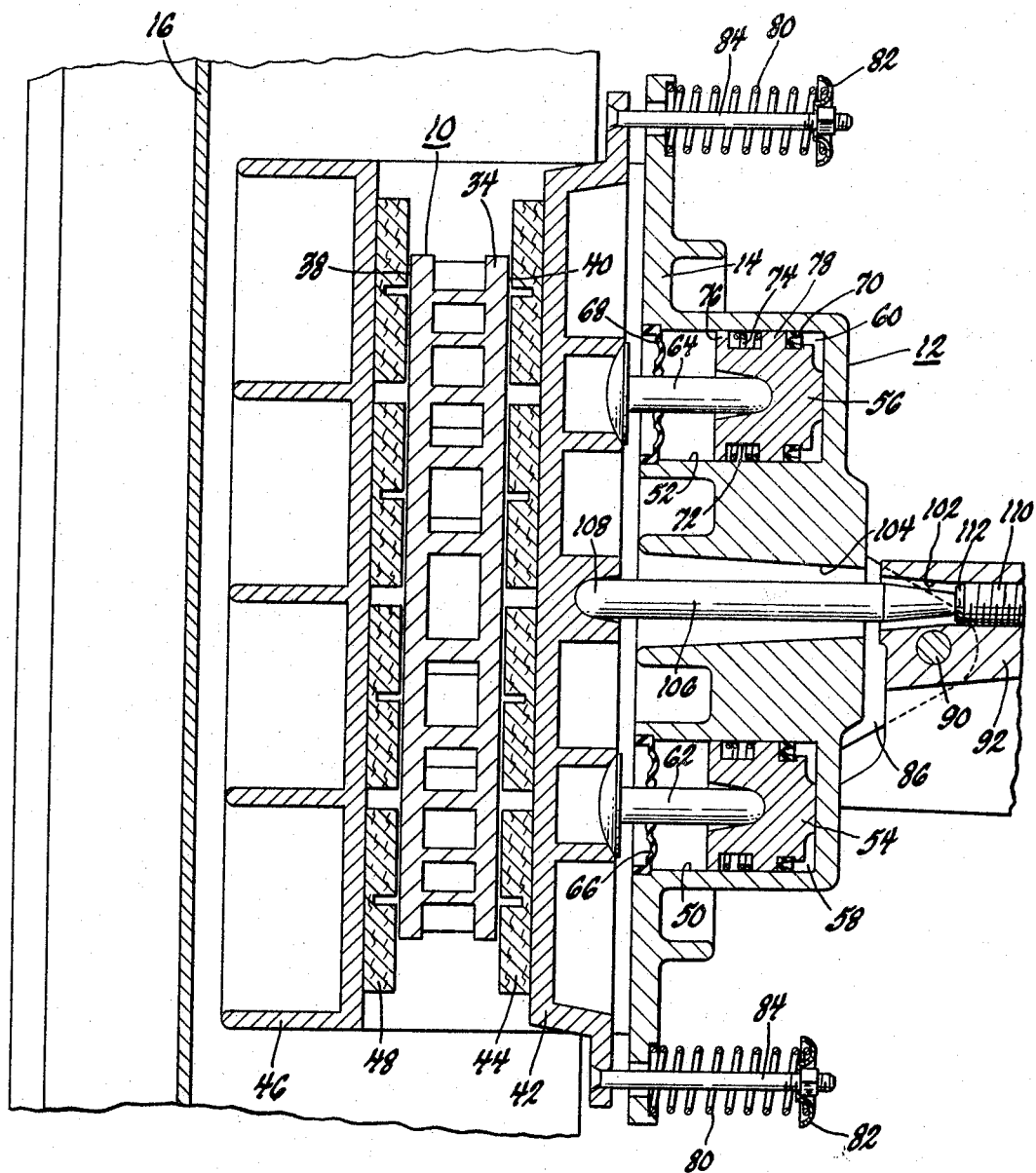
FIGURE 2 is a view of a portion of the brake mechanism taken in the direction of arrows 2—2 of FIGURE 1, with parts broken away and in section.
Figure 3:
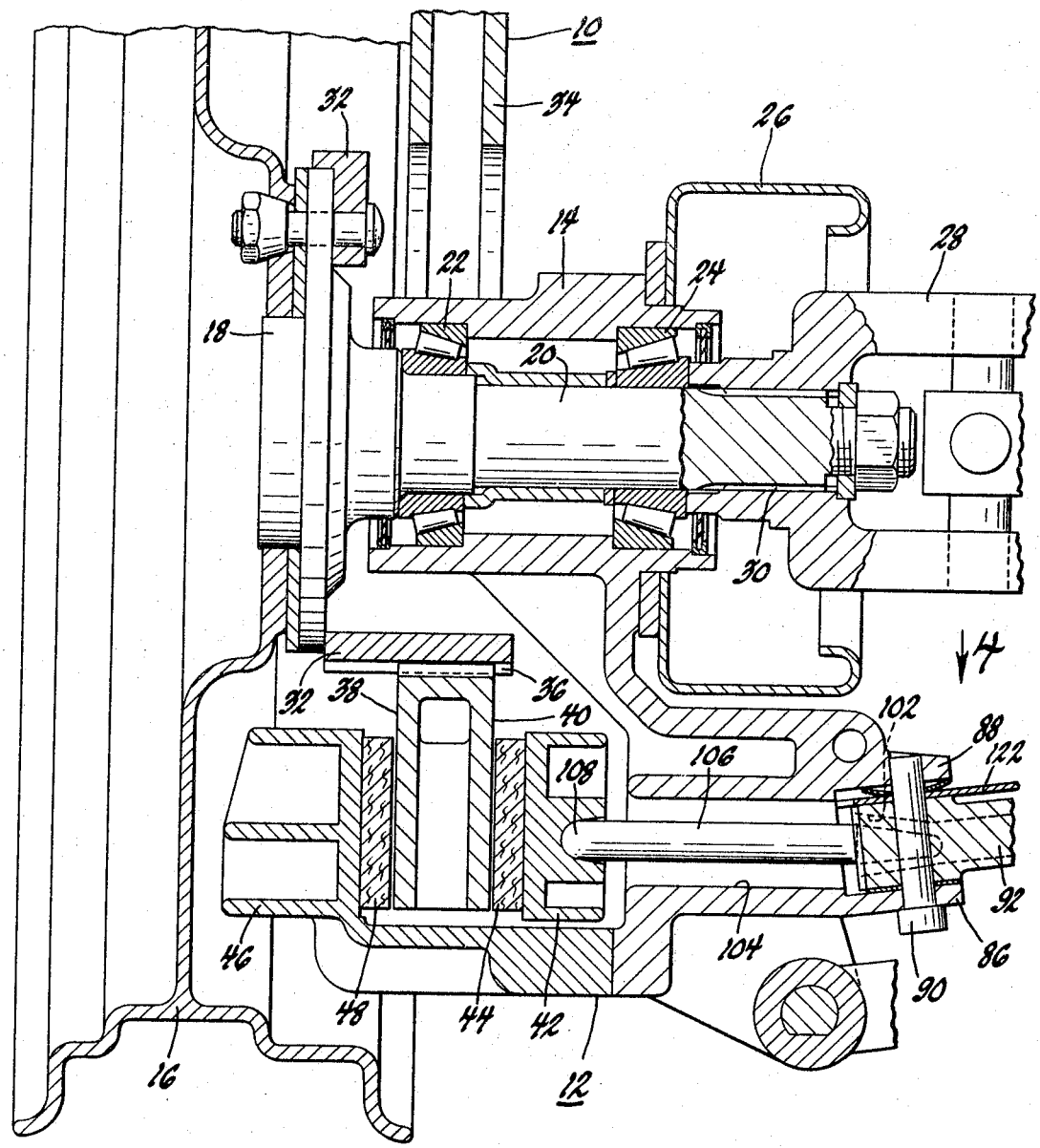
FIGURE 3 is a view of a portion of the brake mechanism taken in the direction of arrows 3—3 of FIGURE 1, with parts broken away and in section.
Figure 4:
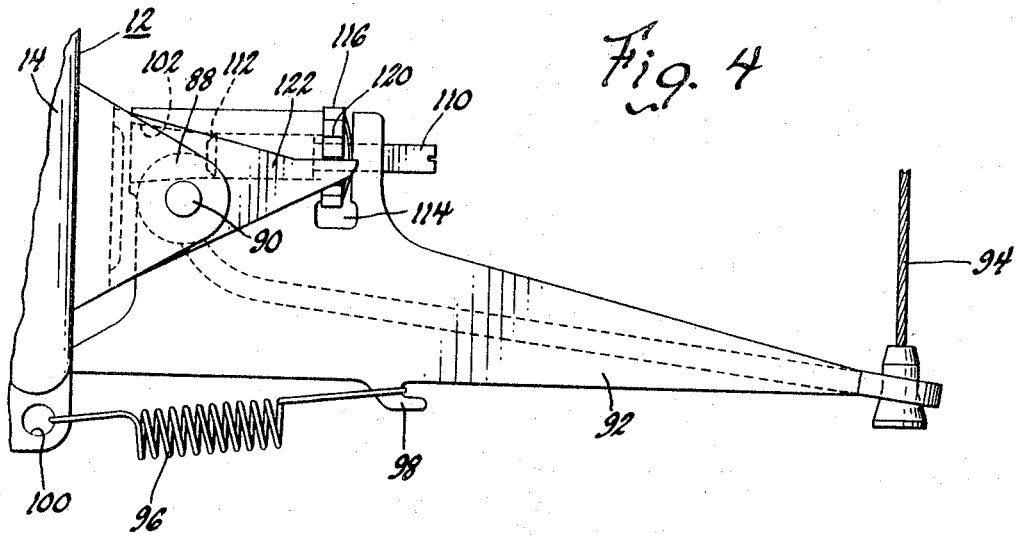
FIGURE 4 is an elevation view of the mechanical actuating and adjusting portion of the brake mechanism as taken in the direction of arrow 4 of FIGURE 3.

The caliper assembly 12 is provided with cylinders 50 and 52 which respectively contain brake actuating pistons 54 and 56 mounted therein for reciprocal movement. The closed ends of the cylinders 50 and 52 and one side of each of the pistons 54 and 56 cooperate to form pressurizing chambers 58 and 60. Pressurized fluid is conducted to these chambers by suitable conduits and passages as is well known in the art from a pressurizing member such as a master cylinder by which the brake is hydraulically actuated. The pistons 54 and 56 drive push rods 62 and 64 which engage the floating brake shoe 42 on the side thereof opposite the friction material 44. Boots 66 and 68 are mounted in the open ends of the cylinders 50 and 52 and seal against the push rods 62 and 64 to prevent entry into the cylinder. Further detailed description of the piston will be related only to piston 56 since the two are identical. Piston 56 is provided with a pressure seal 70 in a seal groove which holds pressurized fluid in chamber 60. Seal 70 is thus positioned toward the rear end of the piston 56. The forward end of the piston is provided with an adjustor groove 72 in which the adjusting spring 74 is received. Spring 74 is helical and provided as a plurality of convolutions. The use of several convolutions of spring wire permits the use of a lower rate spring than heretofore used, with consequent easier control of the required adjusting force. In its free condition spring 74 has an outer diameter somewhat greater than the internal diameter of cylinder 52 so that when it is installed as shown in the drawings it is used radially outward into frictional engagement with the wall of cylinder 52. The free length of spring 74 is preferably slightly less than the width of the groove 72, and the solid length of the spring must be less than the width of groove 72. The piston and adjusting spring are shown in FIGURE 2 in the installed position with new brake lining so that the piston engages the rear of cylinder 52 when it is in the released position. The flange 76 formed as a part of the piston by groove 72 engages or approaches the forward end of spring 74, but the rear end of the piston acts as a piston stop under this particular condition.

Figure 5:
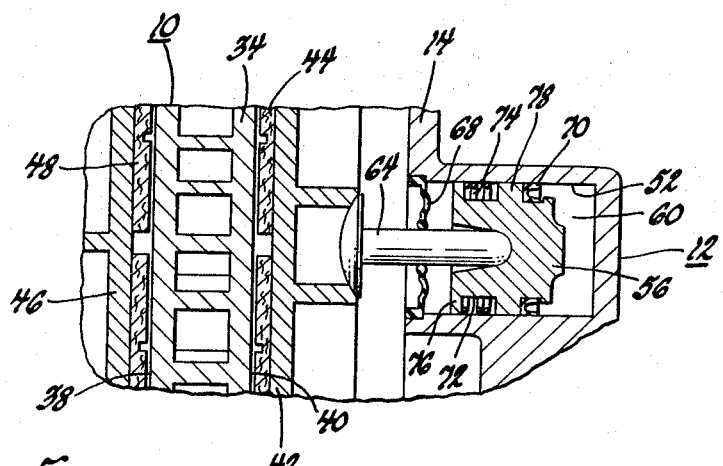
FIGURE 5 is a fragmentary cross section view of the piston adjusting mechanism showing the mechanism in an adjusted position after considerable brake shoe wear has taken place.

The operation of the adjusting mechanism is best described with reference to FIGURE 5 wherein the adjusting mechanism has performed its function to maintain the shoe 42 in adjacent relation to the disc 34. As the brake is applied in the normal course of operation, the friction pads 44 and 48 wear, thus requiring either a greater stroke of the piston 56 each time the brake is actuated, or requiring the clearance between the facing surfaces of the pads to be maintained substantially constant by preventing return movement of the brake shoe 42 beyond a predetermined amount. The latter condition is the more desirable one. This is accomplished by use of the spring adjuster 74 in cooperation with the sides of the groove 72. As earlier noted, the forward end of the piston adjacent groove 72 forms a flange 76. Similarly a rearward portion of the piston relative to groove 72 forms a flange 78. When pressure is applied to chamber 60, the piston 56 moves to the left as seen in the drawings. This moves shoe 42 so that its brake lining 44 engages disc 34 and the disc then moves with the shoe until it also engages brake lining 48, with additional force then giving rise to the braking action. When the brake shoe pads have worn sufficiently through repeated brake applications, the piston flange 78 will compress spring 74 to its solid length. In the meantime, due to the frictional engagement of the spring with the wall of cylinder 52, the forward convolution of the spring does not move and flange 76 moves away from the spring. Further forward movement of piston 56 will cause spring 74 to move within cylinder 52 since the frictional engaging forces thereof are overcome. The spring will remain in the position to which it is moved upon brake application, and piston 56 will move rearwardly upon brake release under influence of the retraction springs 80. As illustrated, springs 80 seat against suitable portions of the housing 14 at one end and act through spring seats 82 and pins 84, which are secured to brake shoe 42, to move the brake shoe toward the brake release position. When piston 56 is moved rearwardly a sufficient distance to engage flange 76 with the forward end of spring 74, no further piston movement occurs since the holding force of spring 74 in cylinder 52 is sufficient to prevent further brake shoe movement under influence of springs 80. Thus the piston, and therefore the brake shoe, is held in position in the newly adjusted position. Such a position is shown in FIGURE 5. Push rod 64, therefore, is held in engagement with shoe 42 and piston 56. Upon each brake actuation after spring 74 has once set the adjusted distance, the spring will tend to move slightly forward in cylinder 52 a distance equal to the wear on the pads 44 and 48 since the last brake actuation so that the brake shoe is adjusted infinitesimally upon each brake application and the desired clearance is maintained. When new brake pads 44 and 48 are installed, piston 56 is simply pushed rearwardly with a force sufficient to overcome the force exerted between the springs 74 and the wall of cylinder 52 so that the adjusting spring is again positioned substantially in the position shown in FIGURE 2. The adjusting sequences can then be repeated as the new pads wear.

In order to provide a brake actuating system operable independently of the hydraulic system, a mechanical mechanism for actuating the brake is utilized. This system includes spaced abutments 86 and 88 formed as a part of housing 14 and having a pin 90 received therein through aligned apertures. The brake acting lever 92 is received in the space between the apertures 86 and 88, and pivots on pin 90. The outer end of lever 92 has the parking brake cable 94 connected to it so that the lever is pivoted by the brake operator against the lever return spring 96. Spring 96 is illustrated as a tension spring connected to the lever 92 by lug 98 at one end and to an aperture 100 in housing 14 at the other end. A passage 102 is provided in a part of lever 92 and is in alignment with a passage 104 formed in the caliper assembly 12. A push rod 106 is loosely received in passages 102 and 104 so that its forward end 108 is engaged in a recess provided on brake shoe 42. The rear end of the passage 102 is threaded and receives adjusting screw 110 therein so that the forward end 112 of the adjusting screw engages the rear end of push rod 106. A slot 114 provided in lever 92 intersects the threaded portion of passage 102 containing adjusting screw 110 and a ratchet wheel 116 is so fixed to screw 110 as to rotate the screw when the wheel is rotated and to slide on the screw axially. For this purpose the rear end of the adjusting screw 110 is of reduced diameter and may be provided with a substantial flat cooperating with a similar flat on the aperture of wheel 116 through which the screw reduced diameter portion passes. Wheel 116 is received within the slot 114 and has teeth 120 which are positioned for engagement with a pawl 122. The pawl is mounted on the housing 14 by means of the pin 90 so as to remain stationary while the lever 92 is actuated. During normal adjustment the motion of lever 92 is not sufficient to rotate the ratchet wheel 116 far enough to engage the next ratchet tooth as the brake is released. When, however, lining wear is sufficient, the pivotal motion of lever 92 increases to the point where the next ratchet tooth is engaged. Brake releasing movement of lever 92 and the action of pawl 122 then causes the ratchet wheel 116 and the adjusting screw 110 to rotate, advancing the screw forwardly in the threaded portion of passage 102 and repositioning push rod 106 so that the mechanical brake actuating system is automatically adjusted for lining wear. The position of pawl 122 and its slight pivotal movement on pin 90, the geometry of the mechanical actuating system, the diameter of ratchet wheel 116 and the number of teeth thereon are so correlated with the amount of adjustment obtained by spring 74 that adjustment of the mechanical actuating system is maintained in a follow-up manner and within predetermined limits of the adjustment made by spring 74.

Thus the brake mechanism has two independent type of brake actuations, each provided with its own adjusting mechanism with the adjusting mechanism correlated to maintain substantially the same adjustment. The slight pivotal movement of pawl 122 about pin 90 is calibrated with the difference between the width of groove 72 and piston 56 as compared to the solid length of spring 74 so as to provide the same spacing of the brake shoes in the released position.

We claim:
1. A brake assembly having a brake shoe, a primary brake actuating mechanism for said brake shoe, a secondary brake actuating mechanism for said brake shoe actuatable independently of said primary actuating mechanism, first calibrated automatic adjusting means for said primary actuating mechanism, and second automatic adjusting means for said secondary actuating mechanism calibrated to adjust said secondary actuating mechanism at substantially the same calibration as the first calibrated automatic adjusting means when said secondary actuating mechanism is actuated to maintain adjustment thereof as the brake shoe wears in substantially equal adjustment with the adjustment of said primary actuating mechanism.

2. A brake assembly having a brake shoe, first and second independently actuatable brake shoe actuating means for said brake shoe, first adjusting means cooperatively interrelated with said first actuating means and adjusting said first actuating means upon each actuation thereof to limit brake shoe retraction to a predetermined distance upon release by said first actuating means, second adjusting means cooperatively interrelated with said second actuating means and adjusting said second actuating means upon actuation thereof at substantially the same calibration as the first adjusting means to maintain an adjustment thereof whereby brake shoe and second actuating means retraction is permitted to the limit established by said first adjusting means and further retraction of said second actuating means is limited to a predetermined minimal additional distance so that said second actuating means is juxtapositioned to the brake shoe in the released position.

3. The brake assembly of claim 2, said first actuating means including a hydraulic pressure actuated piston and cylinder assembly having a multiple convolution adjuster spring directly engaging and cooperating with the piston and cylinder thereof to provide infinitely incremental piston adjustment.

4. In a wheel cylinder assembly having a housing, a cylinder bore in said housing, a piston reciprocably movable in said bore in brake shoe applying and retracting directions, and a push rod engaging said piston and adapted to transmit force between said piston and a brake shoe; brake shoe adjusting means comprising, an annular groove formed in said piston to provide spaced groove sides and an opening closed by the wall of said bore, and a helical spring having a free length less than the distance between the spaced groove sides by an amount substantially equal to the retracted distance the piston is to be permitted and further having a plurality of coils expanded and exerting radial force against the bore wall to resist axial movement of the spring in the bore, movement of the piston in the brake shoe applying direction a distance greater than the permitted retracting distance moving said spring in the same direction, said spring acting as a stop preventing retracting movement of said piston in the retracting direction a distance greater than the permitted retracting distance, thereby maintaining brake shoe adjustment.

5. In a servomotor having a cylinder and a piston reciprocably movable therein, piston movement limiting means for limiting movement of the piston in one direction after piston movement in the other direction and comprising a low rate multi-coil spring having a free outer diameter greater than the diameter of the cylinder and received about a portion of the piston in radially compressed condition in the cylinder, a pair of spaced shoulders formed on the piston a greater distance apart than the axial length of the spring by an amount substantially equal to the permissive movement of the piston in the one direction, said spring being intermediate said shoulders and engaged by one of said shoulders to forcibly move the spring in the cylinder upon movement of the piston in the other direction a distance greater than the permissive one direction movement amount and engaged by the other of said shoulders upon movement of the piston the permissive movement amount in the one movement direction and limiting further movement of the piston in the one direction.

6. A wheel cylinder adjusting means comprising a grooved piston and a cylinder bore reciprocably receiving said piston and a multiple coil spring in the groove of said piston and frictionally engaging the cylinder bore, said spring and the piston forming a lost motion stop resisting piston movement beyond a predetermined limit.

References Cited by the Examiner

UNITED STATES PATENTS

| 2,358,740 | 9/1944 | Iversen | 188—79.5 |
| 3,005,522 | 10/1961 | Butler | 188—196 |
| 3,085,663 | 4/1963 | Jakeways | 188—196 X |
| 3,166,156 | 1/1965 | Burnett et al. | 188—73 |
| 3,185,263 | 5/1965 | Schanz et al. | 188—106 |
| 3,199,635 | 8/1965 | Bessler et al. | 188—106 X |
| 3,211,263 | 10/1965 | Harrison | 188—196 |
| 3,233,705 | 2/1966 | Knapp | 188—106 X |

DUANE A. REGER, *Primary Examiner.*